US010246092B2

(12) United States Patent
Zinner et al.

(10) Patent No.: US 10,246,092 B2
(45) Date of Patent: Apr. 2, 2019

(54) METHOD AND DEVICE FOR DETERMINING A DRIVING STATE OF AN EXTERNAL MOTOR VEHICLE

(71) Applicant: CONTINENTAL AUTOMOTIVE GMBH, Hannover (DE)

(72) Inventors: Helge Zinner, Magdeburg (DE); Olivier Frament, Zeitlarn (DE)

(73) Assignee: Continental Automotive GmbH, Hannover (DE)

(*) Notice: Subject to any disclaimer, the term of this patent is extended or adjusted under 35 U.S.C. 154(b) by 249 days.

(21) Appl. No.: 14/899,002

(22) PCT Filed: May 28, 2014

(86) PCT No.: PCT/EP2014/061068
§ 371 (c)(1),
(2) Date: Dec. 16, 2015

(87) PCT Pub. No.: WO2014/202365
PCT Pub. Date: Dec. 24, 2014

(65) Prior Publication Data
US 2016/0121892 A1 May 5, 2016

(30) Foreign Application Priority Data
Jun. 18, 2013 (DE) .................. 10 2013 211 427

(51) Int. Cl.
*B60W 30/16* (2012.01)
*G01P 1/02* (2006.01)

(52) U.S. Cl.
CPC ............. *B60W 30/16* (2013.01); *G01P 1/026* (2013.01); *B60W 2550/14* (2013.01);
(Continued)

(58) Field of Classification Search
CPC ............ B60W 30/16; B60W 2750/30; B60W 2550/302; B60W 2550/30; B60W 2550/14; G01P 1/026
(Continued)

(56) References Cited

U.S. PATENT DOCUMENTS 5,343,206 A * 8/1994 Ansaldi ................. G01S 13/931
342/179
5,617,085 A * 4/1997 Tsutsumi ............... B60Q 9/008
180/167
(Continued)

FOREIGN PATENT DOCUMENTS

DE 10 2004 028 822 1/2006
DE 10 2009 045 937 4/2010
(Continued)

OTHER PUBLICATIONS

Search Report dated Nov. 8, 2016 which issued in the corresponding Swedish Patent Application No. 1650019-1.
(Continued)

*Primary Examiner* — Lam S Nguyen
(74) *Attorney, Agent, or Firm* — Cozen O'Connor

(57) ABSTRACT

A method that determines a driving state of an external motor vehicle includes: detecting the external motor vehicle by at least one sensor, the external vehicle moving in a longitudinal direction; determining a reference for a motion of the external motor vehicle transverse to the longitudinal direction; determining a first distance between the external motor vehicle and the reference at a first point in time; determining a second distance between the external motor vehicle and the reference at a second point in time lying after the first point in time; determining a difference between the first distance and the second distance; and determining the
(Continued)

driving state as assistance-supported if the difference is less than or equal to a specified value.

3 Claims, 3 Drawing Sheets

(52) U.S. Cl.
CPC ... *B60W 2550/30* (2013.01); *B60W 2550/302* (2013.01); *B60W 2750/30* (2013.01)

(58) Field of Classification Search
USPC .............................................. 701/41, 70, 96
See application file for complete search history.

(56) References Cited

U.S. PATENT DOCUMENTS

| | | | |
|---|---|---|---|
| 5,850,176 A | 12/1998 | Kinoshita et al. | |
| 5,926,126 A * | 7/1999 | Engelman | B60K 31/0008 340/435 |
| 6,643,588 B1 * | 11/2003 | Ibrahim | B60K 31/0008 340/435 |
| 6,753,804 B2 * | 6/2004 | Miyahara | G01S 13/723 180/167 |
| 6,795,765 B2 * | 9/2004 | Miyahara | B60K 31/0008 180/170 |
| 6,873,911 B2 * | 3/2005 | Nishira | B60T 7/16 340/436 |
| 7,742,864 B2 * | 6/2010 | Sekiguchi | B60K 31/0008 180/169 |
| 8,954,260 B2 * | 2/2015 | Gandhi | G08G 1/166 701/116 |
| 9,381,916 B1 * | 7/2016 | Zhu | B60W 30/0956 |
| 9,633,564 B2 * | 4/2017 | Ferguson | G08G 1/166 |
| 9,676,389 B2 * | 6/2017 | Clarke | B60W 30/18163 |
| 9,707,942 B2 * | 7/2017 | Cheatham, III | B60T 7/12 |
| 9,766,626 B1 * | 9/2017 | Zhu | G05D 1/0088 |
| 2010/0036578 A1 * | 2/2010 | Taguchi | B60K 31/0008 701/93 |
| 2012/0176234 A1 | 7/2012 | Taneyhill et al. | |
| 2012/0191271 A1 | 7/2012 | Stuebing | |
| 2012/0191318 A1 | 7/2012 | Holzmann | |
| 2013/0024075 A1 | 2/2013 | Zagorski et al. | |
| 2013/0082874 A1 * | 4/2013 | Zhang | G01S 5/0072 342/357.31 |
| 2013/0307981 A1 * | 11/2013 | Jang | H04N 7/18 348/148 |
| 2014/0297094 A1 * | 10/2014 | Dolgov | B60W 30/095 701/28 |

FOREIGN PATENT DOCUMENTS

| | | |
|---|---|---|
| DE | 10 2010 053 352 | 6/2012 |
| DE | 2011 002 275 A1 | 10/2012 |
| DE | 10 2012 012 829 A1 | 1/2013 |
| EP | 1 557 332 A2 | 7/2005 |
| JP | H 11-153406 | 6/1999 |
| JP | 2011 248532 A | 12/2011 |
| JP | 2012-232733 | 11/2012 |
| WO | WO 2005/123440 | 12/2005 |

OTHER PUBLICATIONS

German translation of an Office Action dated Dec. 20, 2016 which issued in the corresponding Japanese Patent Application No. 2016-520350.

* cited by examiner

METHOD AND DEVICE FOR DETERMINING A DRIVING STATE OF AN EXTERNAL MOTOR VEHICLE

CROSS-REFERENCE TO RELATED APPLICATIONS

This is a U.S. national stage of application No. PCT/EP2014/061068, filed on 28 May 2014, which claims priority to the German Application No. DE 10 2013 211 427.3 filed 18 Jun. 2013, the content of both incorporated herein by reference.

BACKGROUND OF THE INVENTION

1. Field of the Invention

The invention relates to a method and a corresponding device for determining a driving state of an external motor vehicle.

2. Related Art

Systems for motor vehicles that support and take over the driving tasks of the driver are already known. For example, the emergency braking assistant helps to shorten the reaction time of the driver and to increase the braking effect. In addition, systems for automated driving are being considered. In this context, both partially automated and autonomous driving are being investigated. In the ideal case, corresponding systems will have a better reaction time than a human driver. For example, a correspondingly supported vehicle stops more quickly than a vehicle without such support, which may prevent accidents. Conventionally, such novel systems are initially offered in upper-class vehicles. Thus, there will still be many motor vehicles which do not have a system for partially automated or autonomous driving. As a rule, however, a vehicle which drives autonomously and thus also has the corresponding sensors can react more quickly to traffic events and thus stops more quickly than a conventional vehicle. These quick actions are difficult to anticipate for the following traffic. For example, a minimum distance from the preceding vehicle should be enlarged if the preceding vehicle is driving autonomously or partially automated.

SUMMARY OF THE INVENTION

It is an object of the present invention to specify a method or a device, respectively, which provides for reliable detection of a driving state of an external motor vehicle, particularly by conventional sensors on non-automated vehicles.

According to one aspect of the invention, there is provided a method for determining a driving state of an external motor vehicle and a device which is arranged for carrying out the method.

According to at least one embodiment of the invention, the external motor vehicle is detected by at least one sensor. The external motor vehicle is moving in a longitudinal direction. A reference for a movement of the external motor vehicle transversely to the longitudinal direction is determined. A first distance between the external motor vehicle and the reference is determined at a first point in time. A second distance between the external motor vehicle and the reference is determined at a second point in time. The second point in time occurs after the first point in time. A difference between the first and the second distance is determined. The driving state of the external motor vehicle is determined as assistance-supported if the difference is less than or equal to a predetermined value.

By the method it can be determined whether or not the current driving state of the external motor vehicle is assistance-supported. The external motor vehicle is, for example, a preceding motor vehicle, a following motor vehicle and/or a motor vehicle driving alongside. The driving state has, for example, two different values, "assistance-supported" or "non-assistance-supported". The driving state "assistance-supported" means, in particular, that the motor vehicle has a lateral control support. During an assistance-supported driving state, it is particularly the lateral control of the external motor vehicle that is performed automatically, that is to say by a computer system and not by the driver of the external motor vehicle. In the case of a non-assistance-supported driving state of the external motor vehicle, the driver of the external motor vehicle steers the external motor vehicle transversely to the longitudinal direction as is normally the case.

Since assistance-supported motor vehicles can perform a more precise lateral control than would be possible for the driver without support, the external motor vehicle maintains the distance from the reference relatively constantly even over a relatively long period of time. In the case of a motor vehicle without lateral control assistance, the distance varies more over the period of time. Although a person steering the external motor vehicle can stay on track, he drifts more to the left and to the right. It is possible, therefore, by comparing the first distance from the reference at the first point in time with the second distance from the reference at the second state, to determine the driving state of the external motor vehicle.

According to further embodiments, a value of a speed of the external motor vehicle is determined. In particular, the driving speed in the longitudinal direction of the external motor vehicle is determined. The period of time between determining the first distance and determining the second distance is predetermined in dependence on the speed determined. In particular, the period of time is shorter the greater the value of the speed. In this manner the driving state can be determined precisely in dependence on the speed of the external motor vehicle.

According to further embodiments, a number is predetermined for a respective determination of a further distance between the external motor vehicle and the reference in dependence on the value of the speed. For example, more than two distances are determined at different points in time located behind one another, for example three or more distances at points in time behind one another in each case.

According to further embodiments, a type of the external motor vehicle is determined. The period of time between the respective determinations of the distance between the external motor vehicle and the reference is predetermined, for example, in dependence on the type of motor vehicle determined.

Alternatively or additionally, the number of determinations of the respective distance is predetermined in dependence on the type of external motor vehicle determined. Thus, it is possible that during the determining of the driving state, special features and/or characteristics of a respective type of the external motor vehicle will be considered. For example, the types of external motor vehicle and/or their behavior in the respective driving state are stored in a database and/or can be requested from an information system.

According to embodiments, the state determined is output to a user or the system of the motor vehicle which drives in the environment of the external motor vehicle. Thus, it is possible that the user of the motor vehicle adapts his driving behavior to the driving state of the external motor vehicle. If the external motor vehicle exhibits the driving state in an assistance-supported manner, the user of the motor vehicle, for example, can both increase and reduce his distance from the preceding external motor vehicle. According to further embodiments, the determined state is output alternatively or additionally to a control system of the motor vehicle so that, for example, parameters of assistance systems of the motor vehicle can be set in dependence on the driving state of the external motor vehicle. According to further embodiments, the determined state is output alternatively or additionally to an external device, for example to a mobile telephone, a so-called Smartphone and/or a tablet computer.

BRIEF DESCRIPTION OF THE DRAWINGS

Other advantages, features and further developments are obtained from the examples explained in conjunction with the figures in the text which follows. Identical, similar and identically acting elements can be provided with the same reference symbols in this context. In the figures.

DETAILED DESCRIPTION OF THE PRESENTLY PREFERRED EMBODIMENTS

Figure 1:
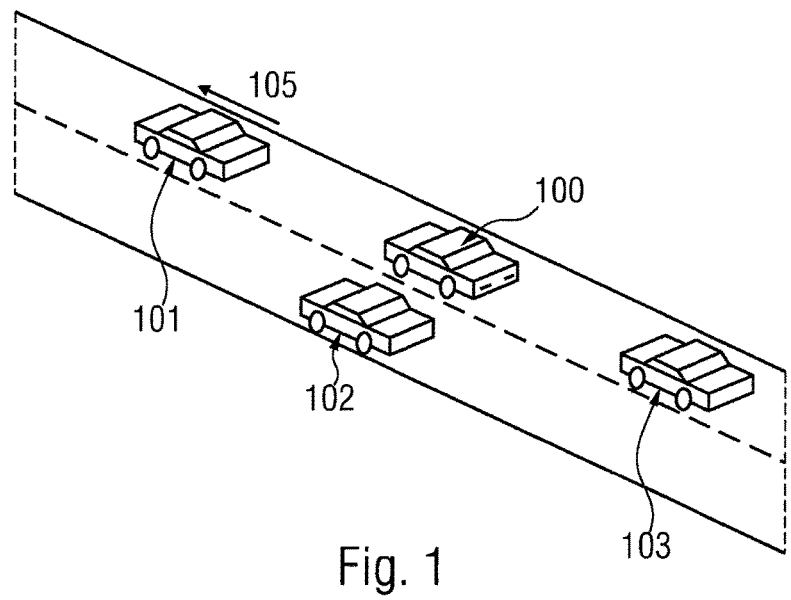
FIG. 1 shows a diagrammatic representation of motor vehicles.

FIG. 1 shows a diagrammatic representation of motor vehicles 100, 101, 102 and 103 which are jointly driving on a road. The motor vehicle 100 in this case exhibits a device 121 (shown in FIG. 3) which is configured to determine the driving state of the external motor vehicles 101, 102 and/or 103. The external motor vehicle 101 is driving ahead of motor vehicle 100, the external motor vehicle 102 is driving next to motor vehicle 100 and the external motor vehicle 103 is driving behind motor vehicle 100. Motor vehicles 100 to 103 are in each case moving in a longitudinal direction 105 along the road.

Figures 2A, 2B:
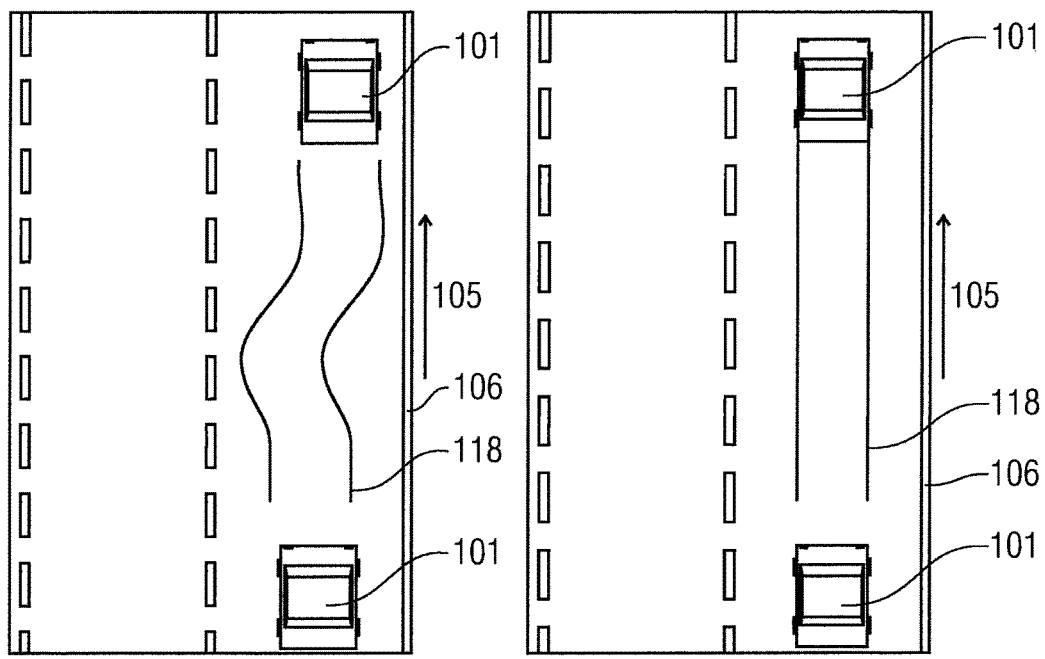
FIGS. 2A and 2B show a diagrammatic representation of the difference of the driving state of motor vehicles.

FIG. 2A shows a diagrammatic representation of the driving behavior of the external motor vehicle 101 when the driving state is not assistance supported. The external motor vehicle 101 is steered by the driver of the external motor vehicle 101. The driver of the external motor vehicle 101 determines the movements of the external motor vehicle 101 transversely to the longitudinal direction 105. In the non-assistance-supported driving state, undulating shapes are produced for a driving track 118 of the external motor vehicle 101 along the longitudinal direction 105. The user of the external motor vehicle 101 steers the external motor vehicle 101 in such a manner that the distance of the motor vehicle 101 from a reference 106 changes even when the driver of the external motor vehicle 101 wishes to drive straight ahead in the direction of the longitudinal direction 105. The reference 106 is, for example, the side strip of the roadway.

Figure 3:
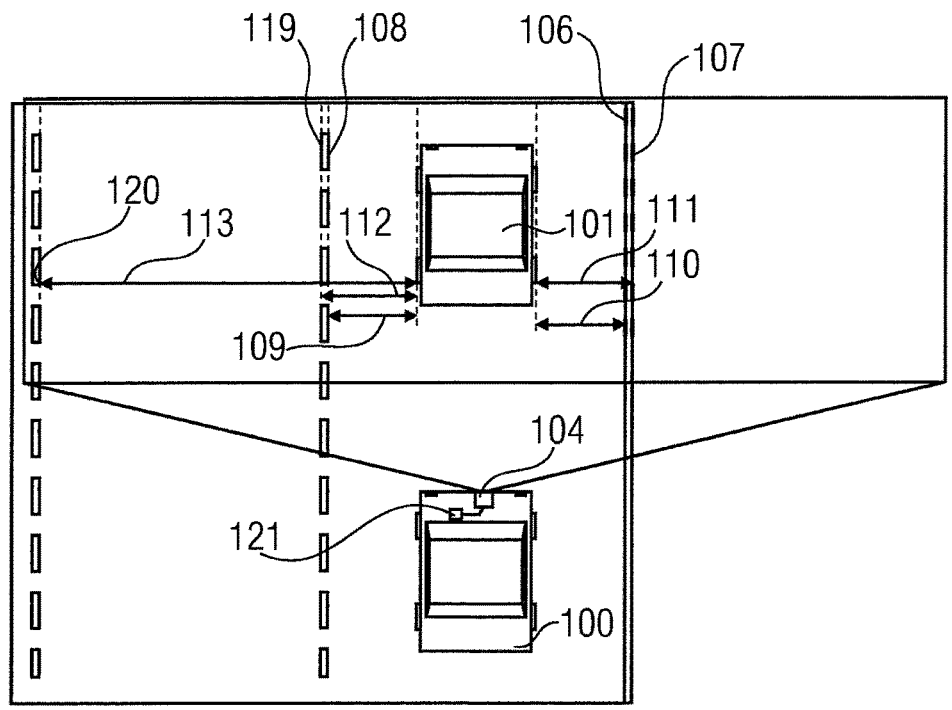
FIG. 3 shows a diagrammatic representation of two motor vehicles driving behind one another.

FIG. 2B shows diagrammatically the shape of the driving track 118 of the external motor vehicle 101 in the driving state as assistance-supported. Due to the computer-supported lateral control of the external motor vehicle 101, the driving track 118 essentially extends in a straight line in the same direction as the longitudinal direction 105. In the assistance-supported driving state, the computer is able to keep the track much more precisely in contrast to a person. The wave shape of the driving track 118, that is to say the fluctuation with respect to reference 106, is distinctly less in the assistance-supported driving state than in the non-assistance-supported driving state. FIG. 3 diagrammatically shows the determination of distances of the external motor vehicle 101 from references according to embodiments. The motor vehicle 100 has a sensor 104 configured to detect the external motor vehicle 101. The sensor 104 comprises a camera or more than one camera according to embodiments. According to further embodiments, the sensor 104 comprises a lidar. According to further embodiments, the sensor 104 comprises a radar. According to further embodiments, the sensor 104 comprises a combination of devices for detecting the external motor vehicle 101. In addition, sensor 104 is configured to detect the reference 106. In particular, the sensor 104 is configured to detect a plurality of references 107, 108, 119 and 120. The references 106, 107, 108, 119 and 120 are roadway markings of the road, in particular, and particularly the edges of the roadway marking at which a contrast between the bright roadway marking and the darker roadway covering is sufficiently well recognizable.

The device 121 of the motor vehicle 100 is configured to determine a distance 109 between the motor vehicle 101 and the reference 108 with the aid of the data of the sensor 104. Alternatively or additionally, the device 121 is configured to determine a distance 110 from the reference 106. Alternatively or additionally, the device 121 is configured to determine a distance 111 from the reference 107. Alternatively or additionally, the device 121 is configured to determine a distance 112 from a reference 119. Alternatively or additionally, the device 121 is configured to determine a distance 113 from the reference 120. According to further embodiments, other distances from other references are additionally determined. According again to other embodiments, fewer than the distances represented in FIG. 3 are determined.

According to further embodiments, the detection shown in Figure for the preceding external motor vehicle 101 is possible alternatively or additionally for the motor vehicle traveling alongside 102 and/or the following motor vehicle 103. Naturally, according to embodiments, the detection is possible for motor vehicles driving alongside both on the left and on the right. According to embodiments, the determination is possible simultaneously for the plurality of motor vehicles 101, 102 and 103.

Figure 4A:
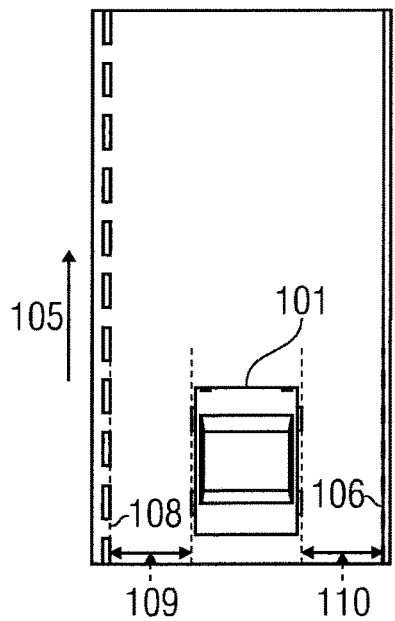
FIGS. 4A to 4C show a diagrammatic representation of a motor vehicle at different points in time.
Figure 4B:
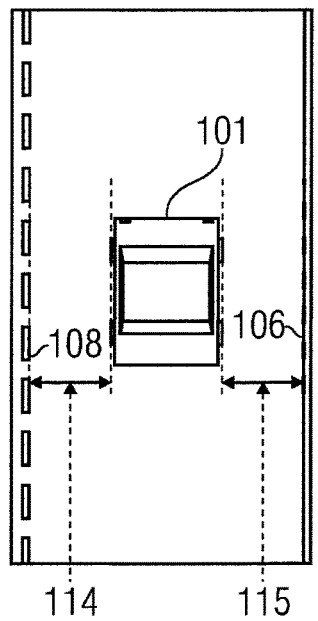

FIG. 4A shows the distance 109 between external motor vehicle 101 and reference 108 at a first point in time. As well, the first distance 110 from reference 106 at the first point in time is shown. Additionally, the speed in the longitudinal direction 105 of the external motor vehicle 101 is determined by the device 121 of the motor vehicle 100 according to embodiments. FIG. 4B shows the second distance 114 from the reference 108 at a later point in time at which the external motor vehicle 101 has moved in the longitudinal direction 105. In addition, the second distance 115 from the reference 106 is shown. The time interval between the determination of the first distances 109 and 110 and the determination of the second distances 114 and 115 is predetermined in the device 121 in dependence on the speed determined for the external motor vehicle 101 according to embodiments. According to further embodiments, a type of sensor 104 for detecting the external motor vehicle 101 in dependence on speed is predetermined. For example, either the camera, the lidar or the radar is used in dependence on the speed determined for the external motor vehicle 101. In addition, according to embodiments it is predetermined in dependence on the speed determined for the external motor vehicle 101 whether a third distance 116 or 117, respectively, and possibly further distances at the second point in time are additionally determined.

Figure 4C:
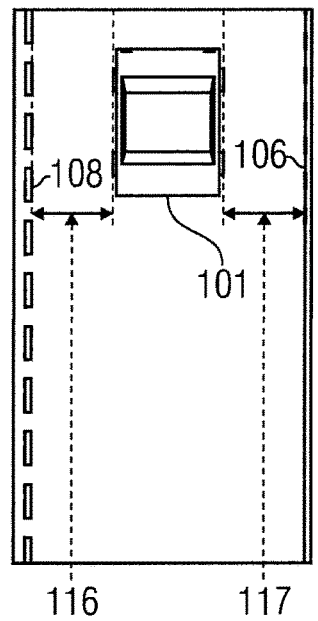

In FIG. 4C, a third distance 116 from the reference 108 and a third distance 117 from the reference 106 at a third point in time is shown. For determining the driving state of the external motor vehicle 101, the distance 109 is compared with the distance 114. According to embodiments, the distance 109 and/or the distance 114 are also compared with the distance 116. The distance 110 is compared with the distance 115. According to further embodiments, the distance 110 and/or the distance 115 are also compared with the distance 117. If the distance 109 is equal to the distance 114 or if the distances 109 and 114 deviate from one another by a predetermined value at a maximum, the external motor vehicle 101 is driving assistance-supported. If the distances 109 and 114 deviate from one another by more than the predetermined value, the external motor vehicle 101 is not driving assistance-supported. For determining the driving state, the further comparisons of the corresponding distances are taken into consideration according to further embodiments. According to embodiments, the type of external motor vehicle 101 is also taken into consideration. It is thus possible to take into consideration type-dependent changes in the distances during the determination of the driving state.

According to embodiments, the driving state determined for the external motor vehicle 101 is output to the user of the motor vehicle 100, that is to say to a person or to a system. For example, a corresponding notice is output to the driver of the motor vehicle 100 on his on-board computer. According to further embodiments, the driving state determined is transferred alternatively or additionally to the control of the motor vehicle 100 so that automatic assistance systems of the motor vehicle 100 operate in dependence on the driving state determined. In particular, it is possible that a distance from the external preceding motor vehicle 101 is increased automatically when the driving state is determined as being assistance-supported. In this manner, accidents can be avoided. It is also possible to find out about tailgaters. Furthermore, it is possible to distinguish between a human driver and a computer as the driver. In addition, accidents can be anticipated early and corresponding assistance systems activated in time. Furthermore, it is possible to recognize a probably correct driving behavior if the driving state is determined as being assistance-supported. It is also possible to obtain prognoses whether the behavior and the actions of the external motor vehicle 101 are predictable. Furthermore, it is possible to provide warning notices for the external motor vehicles 102 and 103 in order to avoid an accident or dangerous situations, respectively. According to embodiments, the motor vehicle 100 itself has an assistant for lateral control. According to further embodiments, the motor vehicle 100 itself does not have an assistant for lateral control.

Figure 5:
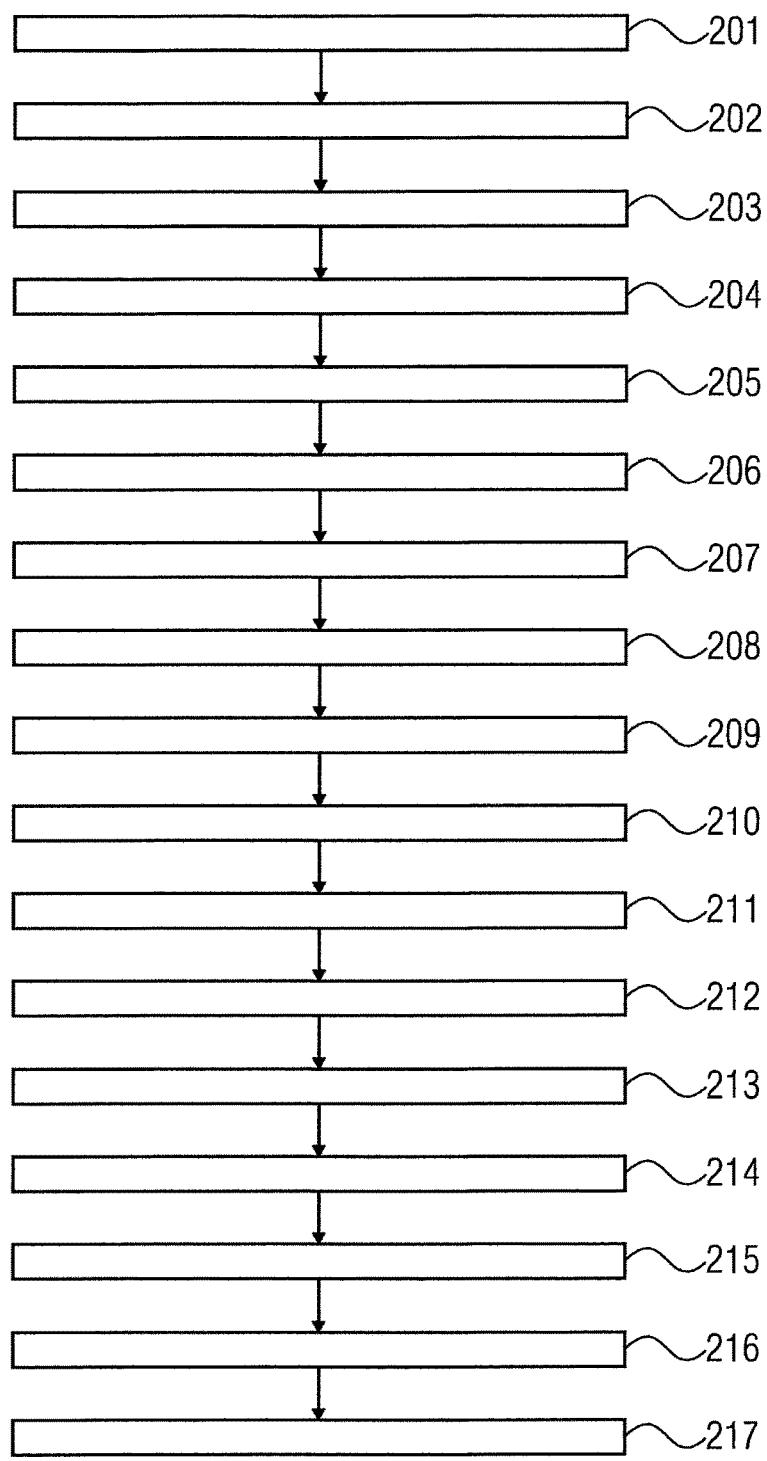
FIG. 5 shows a diagrammatic representation of method steps according to embodiments.

FIG. 5 shows diagrammatically the steps of the method for determining the driving state of the external motor vehicle 101 according to embodiments.

In step 201, the external motor vehicle 101 is visible or selected, respectively, for observation.

In step 202, the speed of the external motor vehicle 101 is determined.

In step 203, the number of measuring periods is determined in dependence on the speed determined.

In step 204, the period of time between the individual measurements is determined in dependence on the speed determined.

In step 205, the appropriate sensor system for sensor 104 is determined in dependence on the speed determined.

In step 206, object detection is performed and the external motor vehicle 101 is detected by sensor 104.

In step 207, reference 106 and/or further references are determined from which the distance of the external motor vehicle 101 can be measured horizontally.

In step 208, the first distance 109 from reference 108 is determined. The first distance 109 is stored.

In step 209, it is checked whether the preceding vehicle is the same external motor vehicle 101 as in step 201.

If the preceding vehicle is still the same external motor vehicle 101, the second distance 114 from the same reference 108 as in the case of the first distance 109 is determined in step 210 and the value is stored.

In step 211, it is determined whether the preceding vehicle is still the same external motor vehicle 101 and whether the reference is still the same. In addition, it is checked according to embodiments whether the object is still relevant to the observation.

In step 212, the third distance 116 from the same reference 108 is determined and the value determined is stored. In step 213 it is checked, comparably to step 211, whether the preceding vehicle is still the same external motor vehicle 101, the reference is still the same and whether the object is still relevant to the observation.

In step 214, a further distance measurement from the same reference 108 is then performed according to embodiments.

In step 215, it is checked whether the preceding vehicle is still the same external motor vehicle 101, whether the reference 108 is still the same and whether the object is still relevant to the observation.

In step 216, the distances determined in step 208, 210, 212 and 214 are compared with one another. In particular, a difference between the distances determined is determined.

In step 217, the difference determined is compared with a predetermined value. If the difference is less than the predetermined value or equal to the predetermined value, the driving state is determined to be assistance-supported. Otherwise, the driving state is determined as not being assistance-supported. It can thus be established whether a person or a computer system handles the lateral control of the external motor vehicle 101.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method that determines, in a first vehicle (100), whether an external motor vehicle (101, 102, 103) uses automated lateral control assistance, the method comprising:
   detecting, using at least one sensor (104) of the first vehicle, the external motor vehicle (101, 102, 103) moving in a longitudinal direction (105);
   detecting, by the at least one sensor, reference road markings (106, 108) by reference to which a movement of the external motor vehicle (101, 102, 103) transversely to the longitudinal direction (105) can be determined;
   determining a first distance (109, 110) between the external motor vehicle (101, 102, 103) and at least one of the reference road markings (106, 107, 108) at a first point in time;
   determining a second distance (114, 115) between the external motor vehicle (101, 102, 103) and the at least one of the reference road markings (106, 107, 108) at a second point in time, which is after the first point in time;
   in a case in which the difference between the first distance (109, 110) and the second distance (114, 115) is less than or equal to a predetermined value, then:
   informing a control system of the first vehicle (101) that the external motor vehicle (101, 102, 103) uses automated lateral control assistance, and controlling an automated lateral control system of the first vehicle to adjust parameters of the automated lateral control system of the first vehicle based on the informing; and
   controlling, by the automatic lateral control system of the first vehicle, the first vehicle so as to automatically increase the distance between the first vehicle and the external motor vehicle, based on the adjusted parameters, when the control system of the first vehicle has been informed that the external motor vehicle is using automated lateral control assistance.

2. The method as claimed in one of claim 1, wherein at least one sensor (4) comprises at least one selected from the group of a camera, a lidar and a radar.

3. A device, in a first vehicle (100), that determines whether an external motor vehicle (101, 102, 103) uses automated lateral control assistance, the device being configured to:
   detect, using at least one sensor (104), the external motor vehicle (101, 102, 103) moving in a longitudinal direction (105);
   detect, by the at least one sensor (104), reference road markings (106, 108) by reference to which a movement of the external motor vehicle (101, 102, 103) transversely to the longitudinal direction (105) can be determined;
   determine a first distance (109, 110) between the external motor vehicle (101, 102, 103) and at least one of the reference road markings (106, 107, 108) at a first point in time;
   determine a second distance (114, 115) between the external motor vehicle (101, 102, 103) and the at least one of the reference road markings (106, 107, 108) at a second point in time, which is after the first point in time;
   in a case in which the difference between the first distance (109, 110) and the second distance (114, 115) is less than or equal to a predetermined value, then:
   inform a control system of the first vehicle (101) that the external motor vehicle (101, 102, 103) uses automated lateral control assistance, and control an automated lateral control system of the first vehicle to adjust parameters of the automated lateral control system of the first vehicle based on the informing; and
   control, by the automatic lateral control system of the first vehicle, the first vehicle so as to automatically increase the distance between the first vehicle and the external motor vehicle, based on the adjusted parameters, when the control system of the first vehicle has been informed that the external motor vehicle is using automated lateral control assistance.

* * * * *